US012089316B1

(12) United States Patent
Gu

(10) Patent No.: US 12,089,316 B1
(45) Date of Patent: Sep. 10, 2024

(54) PLC SIGNAL CONTROL LAMP SYSTEM WITH ADAPTIVE POWER SUPPLY

(71) Applicant: Jiangmen Jinglian Technology Development Co., Ltd., Jiangmen (CN)

(72) Inventor: Hebin Gu, Wuxi (CN)

(73) Assignee: Jiangmen Jinglian Technology Development Co., Ltd.

(*) Notice: Subject to any disclaimer, the term of this patent is extended or adjusted under 35 U.S.C. 154(b) by 0 days.

(21) Appl. No.: 18/539,318

(22) Filed: Dec. 14, 2023

(51) Int. Cl.
*H05B 47/185* (2020.01)
*H05B 45/385* (2020.01)

(52) U.S. Cl.
CPC ......... *H05B 47/185* (2020.01); *H05B 45/385* (2020.01)

(58) Field of Classification Search
CPC ... H05B 47/185; H05B 47/187; H04B 45/385
See application file for complete search history.

(56) References Cited

U.S. PATENT DOCUMENTS 9,161,415 B2 * 10/2015 Catalano ................ G01K 13/00
9,307,619 B2 * 4/2016 Campbell ............ H05B 47/185
2010/0027599 A1 * 2/2010 Di Chiro .................. H04B 3/56 375/222
2012/0133298 A1 * 5/2012 Campbell ............ H05B 47/185 315/250
2012/0280565 A1 * 11/2012 Logvinov ................ H04B 3/54 315/307
2016/0080036 A1 * 3/2016 Su ......................... H02M 1/126 363/44
2017/0105272 A1 * 4/2017 Johnson ................. H05B 45/31
2019/0207650 A1 * 7/2019 Kearney .................. H04B 3/54
2021/0003982 A1 * 1/2021 Wang ...................... H01H 47/00
2021/0203381 A1 * 7/2021 Zhang ...................... H04B 3/46
2023/0189409 A1 * 6/2023 Xiong .................... H05B 45/31 315/294
2023/0326332 A1 * 10/2023 Dong ..................... G08C 19/12 340/12.1

* cited by examiner

*Primary Examiner* — Jason M Crawford
(74) *Attorney, Agent, or Firm* — Jose Cherson Weissbrot

(57) ABSTRACT

A PLC signal control lamp system with adaptive power supply, which comprises a signal control module and a signal receiving module; the signal control module is coupled between the commercial power and a lamp and encodes an electric signal, and comprises an MCU control submodule, a clock signal submodule and a switch circuit; the signal receiving module is arranged in the lamp, decodes the electric signal and adjusts the lighting of the lamp. The present invention can adjust the lighting of the lamp without adding a dimming wire, and is more convenient to install, modify and maintain.

10 Claims, 1 Drawing Sheet

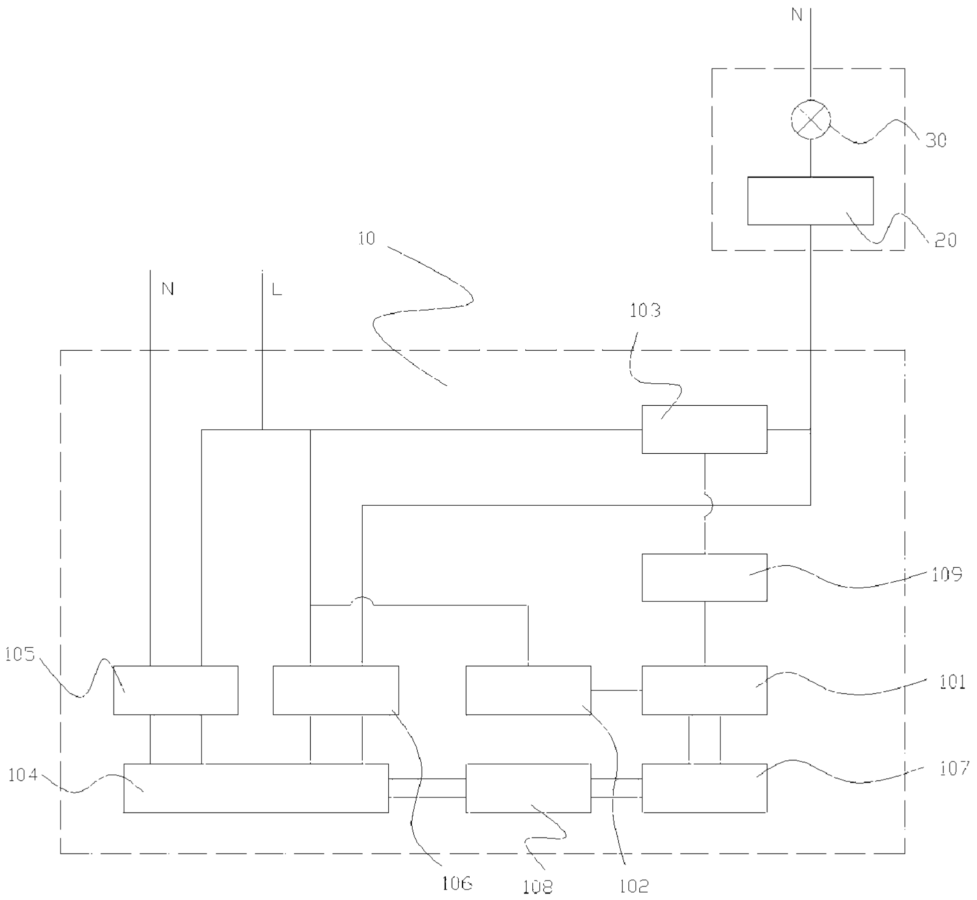
N
30
20
10
N
L
103
109
105
101
104
107
106
108
102

PLC SIGNAL CONTROL LAMP SYSTEM WITH ADAPTIVE POWER SUPPLY

TECHNICAL FIELD

The present invention relates to the field of lighting lamps, in particular to a PLC signal control lamp system with adaptive power supply.

BACKGROUND

Lighting has always been the most indispensable part of human life. In the past, incandescent lamps and fluorescent lamps were widely used for lighting in various places. However, with the development of the times, traditional lighting lamps have gradually failed to meet people's needs in life or work, and traditional lighting lamps also have problems such as high energy consumption, unstable lighting, heavy pollution and short life, so LED lamps that gradually enter people's field of vision will be the best choice in the new era. In addition, LED lamps can also achieve dimming and color matching functions by adding additional dimming light or wireless control.

U.S. patent document US-20230189409-AT discloses an LED lamp lighting system, a dimmer thereof and an LED lamp, wherein the LED lamp lighting system comprises a dimmer, an input end of which is electrically connected with a first external power input end and configured to receive an external power signal to generate a dimming signal; a LED lamp electrically connected with the first output end; the second output end and the second external power input end of the dimmer to receive the dimming signal and adjust the brightness or color temperature of the LED lamp; referring to FIGS. 1B and 2, the LED lighting system 20 includes a power adapter PA and an LED lighting device 200. The power adapter PA is arranged outside the LED lighting device 200 and can be configured to convert an AC input power Pin into a power signal, wherein the power adapter PA includes a dimmer 80 and can be configured to perform dimming processing on the power signal converted by the power adapter PA according to a dimming instruction dim, and correspondingly process and generate a modulated power Pin_C; the power adapter PA may further include a signal adjustment module 60 and a switching power supply module 70; at this time, the signal adjustment module 60 receives the input power pin and is configured to perform signal conditioning on the AC input power pin, such as rectification or filtering; the switching power supply module 70 is electrically connected with the signal adjustment module 60, and is configured to perform power conversion on the signal-adjusted input power supply pin to generate and output a stable power supply signal; the dimmer 80 is electrically connected with the switching power supply module 70, and is configured to modulate the power supply signal output by the switching power supply module 70, so as to convert the dimming instruction DIM into a specific form/signal characteristic, load it on the power supply signal output by the switching power supply module 70, and generate a modulated power supply Pin_C after the dimming process; however, the above solution still has its shortcomings:

1) additional a dimming wire is needed to control the lighting mode of lamps, which is not only difficult to install, but also consumes more wiring materials;
2) it is necessary to reserve a zero line when decorating and wiring, which is more suitable for users who are not decorated; for users who have completed the renovation, the line needs to be transformed; and the modification and maintenance are difficult;
3) for a lamp group, all lamps can only be connected in parallel with each other, and there is no way to set them in a loop.

SUMMARY

This invention provides a PLC (Programmable Logic Control) and hereafter referred as PLC signal control lamp system with adaptive power supply, the PLC signal control lamp system comprising a signal control module and a signal receiving module, wherein the signal receiving module is arranged on lamps, and the signal control module is coupled between commercial power and the lamps; and the signal control module comprises an MCU (Microcontroller Unit) and hereafter referred as MCU control submodule, a clock signal submodule and a switch circuit; and the clock signal submodule is electrically connected with a live wire and outputs a clock signal to the MCU control submodule; and the switch circuit is connected with the live wire in series, receives a PLC signal output by the MCU control submodule, and encodes an electric signal on the live wire according to the PLC signal; and the signal receiving module is installed in the lamps and used for decoding the electric signal transmitted by the live wire and adjusting a working state of the lamps.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

FIG. 1 is a schematic circuit block diagram of the present invention.

As shown in the FIGURE: Signal control module, 10; Signal receiving module, 20; Lamps, 30; MCU control submodule, 101; Clock signal submodule, 102; Switching circuit, 103; Filter submodule, 104; First commutator module, 105; Second commutator module, 106; DC power supply submodule, 107; Step-down submodule, 108; PLC signal, 109.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

The present invention will be further described in detail with reference to the attached drawings and specific embodiments.

As shown in FIG. 1, a PLC signal control lamp system with adaptive power supply includes a signal control module and a signal receiving module, wherein the signal receiving module is arranged on the lamps, and the signal control module is coupled between the commercial power and the lamps; the signal control module includes a MCU control submodule, a clock signal submodule and a switch circuit; the clock signal submodule is electrically connected with a live wire and outputs a clock signal to the MCU control submodule; the switch circuit is connected in series on the live wire, receives a PLC signal output by the MCU control submodule, and encodes the electric signal on the live wire according to the PLC signal; the signal receiving module is installed in the lamp and used for decoding the electric signal transmitted by the live wire and adjusting the working state of the lamp; as an example, the commercial power is 220V AC, and the lamps are LED bulbs.

In this embodiment, the signal control module further includes a filter submodule and a first commutator module; the first commutator module is coupled with the commercial power and electrically connected with the filter submodule.

In this embodiment, the signal control module further includes a DC power supply submodule, and the output end of the DC power supply submodule is electrically connected with the input end of the MCU control submodule.

In some embodiments of the present disclosure, the signal control module further includes a step-down submodule, and the input end of the step-down submodule is coupled with the output end of the filter submodule, and the output end is electrically connected with the input end of the DC power supply submodule.

In this embodiment, the step-down submodule is suitable for 220V AC voltage, and its output voltage is not more than 36 V.

In this embodiment, the signal control module further includes a second commutator module, one input end of which is connected with the live wire, and a neutral wire is connected to the other input end of the second commutator module after passing through the signal receiving module on the lamp.

In this embodiment, the MCU control submodule can receive mechanical signals and encode them into PLC signals.

In some embodiments of the present disclosure, a chip model used by the MCU control submodule is CX32L003, which is a general-purpose chip embedded with a microcontroller with ultra-low power consumption, Low Pin Count and wide voltage working range (2.5V-5.5V) of 32-bit ARM® Cortex®-M0+ core, and can run at 24 MHz at the highest, with built-in 32K/64K byte embedded Flash, 4K byte SRAM, integrated with 12-bit 1 Msps high-precision SAR ADC, RTC, comparator, multi-channel UART, SPI, I2C and PWM and other rich peripheral interfaces.

In some embodiments of the present disclosure, the chip model used in the signal receiving module is CL51ALC3, which is a general-purpose chip, an 8-bit microcontroller designed and developed with low power consumption and high-speed CMOS technology, and it has a 1K×13-bit one-time programmable read-only memory (OTP-ROM) inside, which provides one guard bit to prevent the user's program from being read in the OTP-ROM and has 15 code option bits to meet the needs of the user.

In some embodiments of the present disclosure, the pressure stabilizing IC model used in the DC power submodule is LM317, which is a general IC chip and an adjustable 3-terminal voltage regulator, and can provide more than 1.5 A current in the output voltage range of 1.25V-37V.

In this embodiment, when in use, the first commutator module or the second commutator module is connected to the power grid and rectified with alternating current, so as to obtain direct current; the filter submodule filters the direct current to make the current stable; the step-down submodule converts the original high DC voltage into a low DC voltage which will not pose a threat to human health and safety, and is lower than 36V, so that users can operate directly on the control panel safely; the DC power supply submodule further ensures that the voltage supplied to MCU remains stable, which enhances the anti-interference ability of the system; the clock signal of the MCU control submodule uses the clock frequency obtained by the clock signal submodule from the power grid, and receives external signals sent by users, thus generating PLC signals; the switch circuit is connected in series on the live wire, and the received PLC signal is modulated on the electrical signal of the live wire while controlling the on-off of the lamp; when the switch is turned on, the modulated electrical signal can be directly transmitted to the signal receiving module for reception; the signal receiving module decodes the electrical signal to get the corresponding information, so as to adjust the input signal of the LED, and finally realize the functions of dimming and color modulation.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A Programmable Logic Controller (PLC) signal control lamp system with adaptive power supply, comprising a signal control module and a signal receiving module, wherein said signal receiving module is arranged on lamps, and said signal control module is coupled between commercial power and the lamps; and said signal control module comprises an Microcontroller Unit (MCU) control submodule, a clock signal submodule and a switch circuit; and said clock signal submodule is electrically connected with a live wire and outputs a clock signal to the MCU control submodule; and said switch circuit is connected with the live wire in series, receives a PLC signal output by the MCU control submodule, and encodes an electric signal on the live wire according to the PLC signal; and said signal receiving module is installed in said lamps and used for decoding the electric signal transmitted by the live wire and adjusting a working state of the lamps.

2. The PLC signal control lamp system with adaptive power supply according to claim 1, wherein said signal control module further comprises a filter submodule and a first commutator module; and said first commutator module is coupled with commercial power and electrically connected with the filter submodule.

3. The PLC signal control lamp system with adaptive power supply according to claim 2, wherein said signal control module further comprises a DC power supply submodule, and an output end of said DC power supply submodule is electrically connected with an input end of the MCU control submodule.

4. The PLC signal control lamp system with adaptive power supply according to claim 3, wherein a voltage stabilizing IC model used by said DC power supply submodule is LM317.

5. The PLC signal control lamp system with adaptive power supply according to claim 3, wherein said signal control module further comprises a step-down submodule, and an input end of said step-down submodule is coupled with an output end of the filter submodule, and an output end is electrically connected with an input end of the DC power supply submodule.

6. The PLC signal control lamp system with adaptive power supply according to claim 5, wherein said step-down submodule is suitable for an AC voltage of 110V/120V/220V/240V/277V/347V, with an output voltage not more than 36 V.

7. The PLC signal control lamp system with adaptive power supply according to claim 2, wherein said signal control module further comprises a second commutator module, one input end of which is connected with the live wire, and a neutral wire is connected to the other input end of the second commutator module after passing through the signal receiving module on the lamps.

8. The PLC signal control lamp system with adaptive power supply according to claim 1, wherein said MCU control submodule is capable of receiving at least one external signal and encoding the external signal into a PLC signal, and said external signal comprises but not limited to a mechanical signal and an infrared signal.

9. The PLC signal control lamp system with adaptive power supply according to claim 1, wherein a chip model used by said MCU control submodule is CX32L003.

10. The PLC signal control lamp system with adaptive power supply according to claim 1, wherein a chip model used by said signal receiving module is CL51ALC3.

* * * * *